Feb. 26, 1935.  F. GIRARDI  1,992,419
SPEED CHANGE GEAR SET OPERATING MECHANISM
Filed Sept. 10, 1932  4 Sheets-Sheet 1

Inventor
Frank Girardi
By Rudolph Wm Lotz
Attorney.

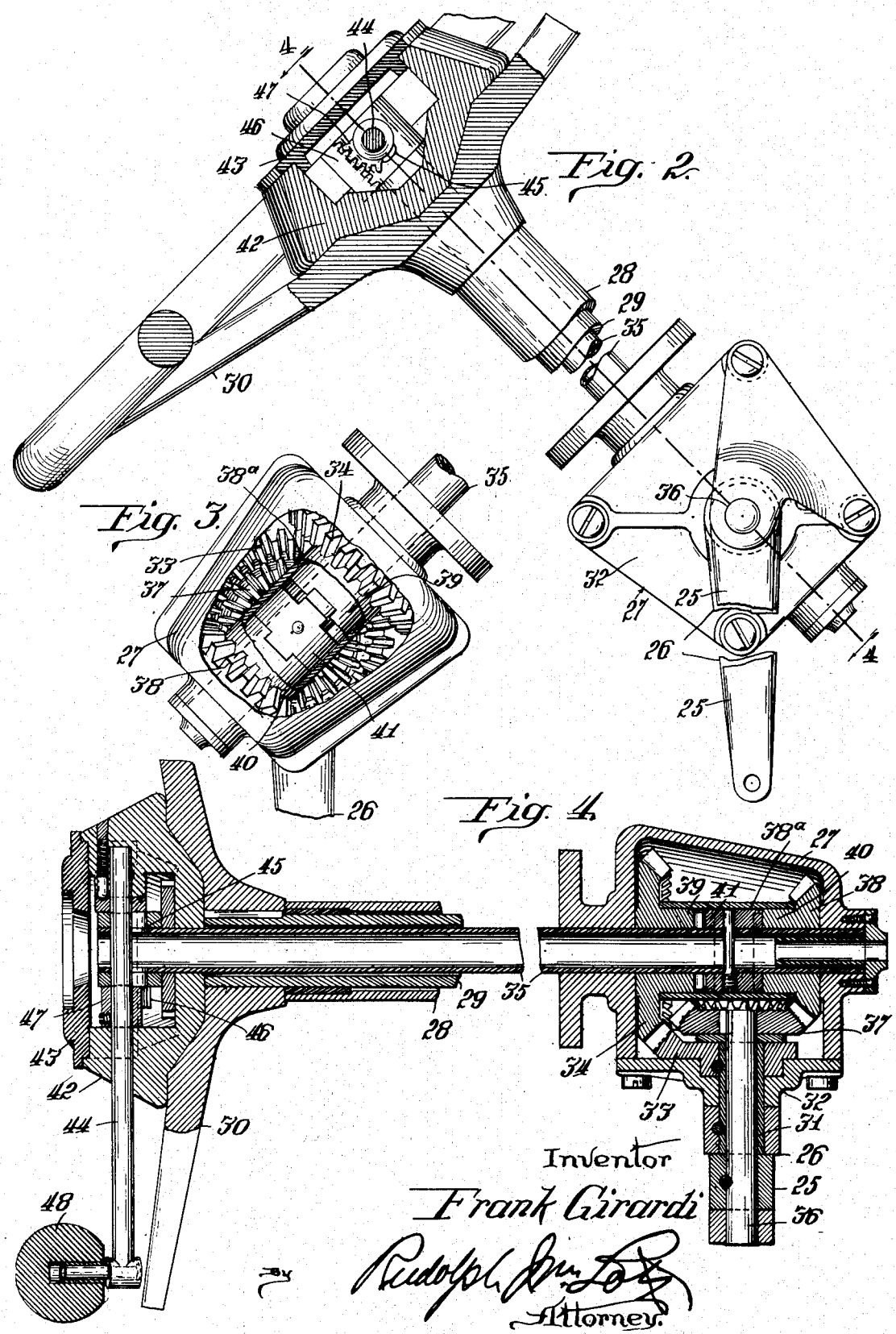

Feb. 26, 1935.　　　　F. GIRARDI　　　　1,992,419
SPEED CHANGE GEAR SET OPERATING MECHANISM
Filed Sept. 10, 1932　　　4 Sheets-Sheet 3
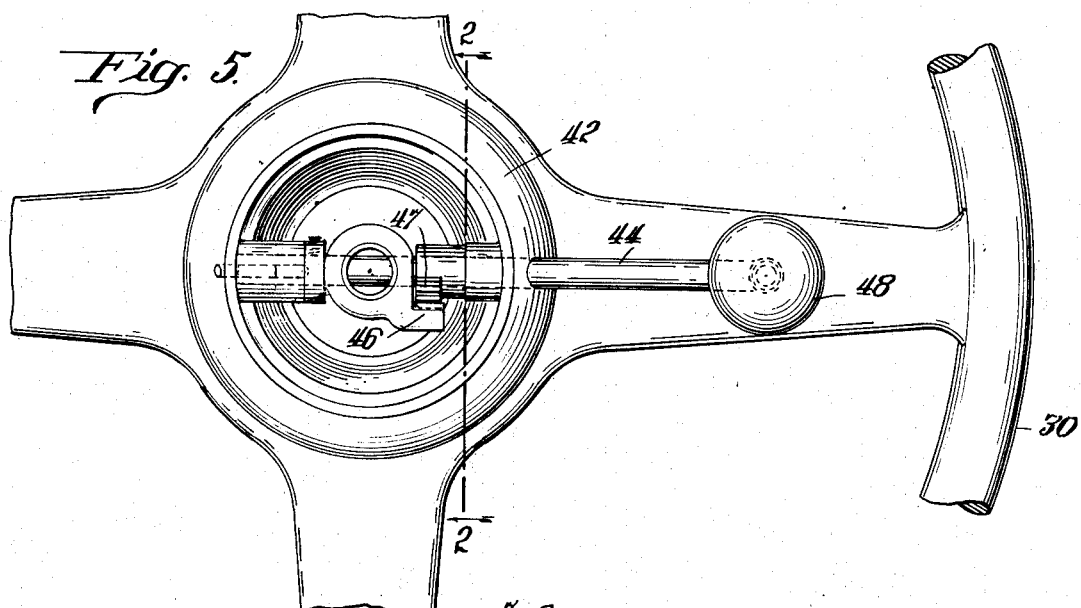
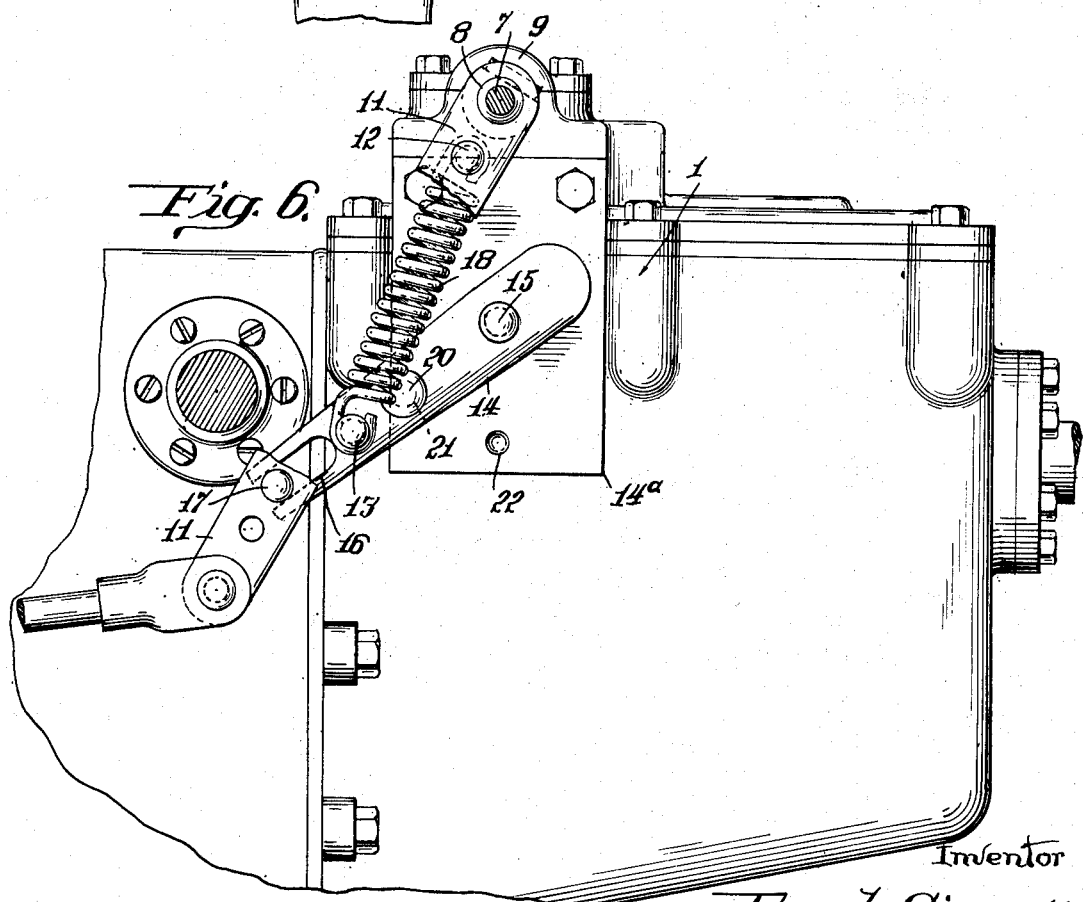
Inventor
Frank Girardi
By Rudolph (signature)
Attorney.

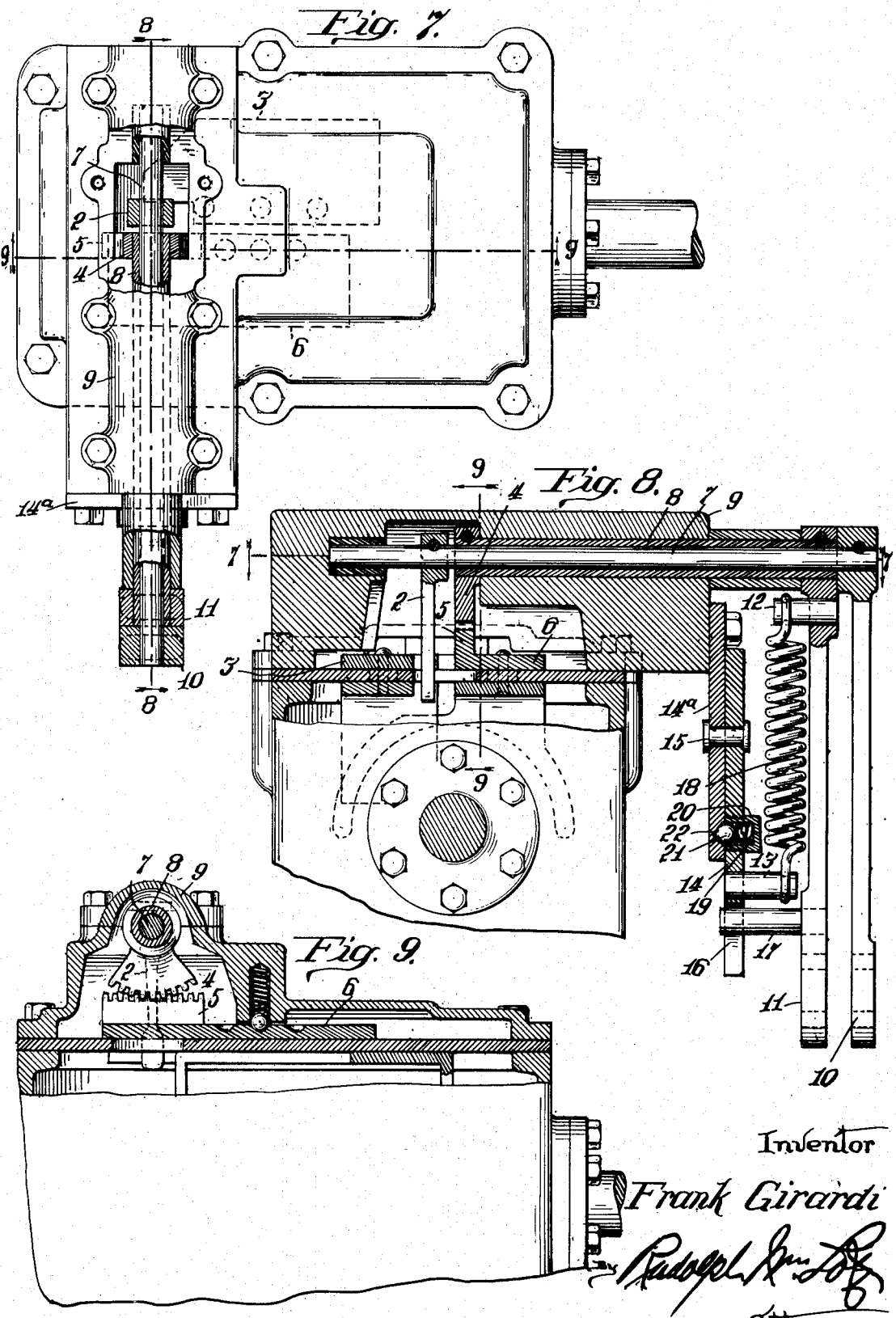

Patented Feb. 26, 1935

1,992,419

UNITED STATES PATENT OFFICE 1,992,419

SPEED CHANGE GEAR SET OPERATING MECHANISM

Frank Girardi, Chicago, Ill., assignor of one-third to Joseph Burescio and one-third to Salvatore Cipullo, both of Chicago, Ill.

Application September 10, 1932, Serial No. 632,497

28 Claims. (Cl. 74—473)

This invention has for its general object to provide manually operable mechanism disposed within and upon the steering post of an automotive vehicle for controlling the change-speed gear set of the same.

A particular object of the invention is to provide change-speed control means, of the kind specified, wherein the levers for effecting speed-changes are actuated by bevel gearing controlled by clutches which are controlled by a single manually operable lever disposed upon the upper end of the steering post and overhanging the steering wheel and which is operable to be swung about the axis of the steering wheel to effect operation of one of the levers which effects a speed-change and which is operable about an axis transverse to and intersecting the steering post axis to effect selection of the gear train to be operated for actuating the desired lever.

Another object of the invention is to provide strong, durable, and compact mechanism of the type indicated, which is both simple and relatively cheap and which is adapted to be associated with any one of the several types of change-speed gear sets now commonly used in automotive vehicles.

A further object of the invention is to provide a mechanism of the type indicated wherein a portion of the force required to be exerted to effect a speed-change in two instances is effected by a spring in the case of the synchromesh type of change-speed gear sets.

Other and further objects of the invention will be pointed out or understood from the following specification.

In the accompanying drawings illustrating the invention:

Fig. 2 is a side elevation, partly in section, on the line 2—2 of Fig. 5, showing the steering post and the gear casing at the lower end of the same, part of the steering post being broken out.

Fig. 3 is a side elevation of the gear casing, partly broken away to show the gearing and clutch mechanism contained therein, seen from the side opposite to that shown in Fig. 2.

Fig. 4 is a longitudinal section, through the steering post and gear casing, on the line 4—4 of Fig. 2.

Fig. 5 is a fragmentary plan view of the steering wheel and the upper end of the steering post, a cap member being omitted.

Fig. 6 is a side elevation of the casing of the change-speed gear set showing the steering shaft and one of the actuating shafts of the change-speed gear sets in section and showing also certain parts of the mechanism actuated by the gears of the gear casing of the steering post.

Fig. 7 is a plan section, partly in elevation, of the change-speed gear set casing and operating mechanism, taken on the line 7—7 of Fig. 8.

Fig. 8 is a sectional view, partly in elevation, taken on the line 8—8 of Fig. 7.

Fig. 9 is a vertical sectional view taken on the line 9—9 of Fig. 8.

Figure 1:
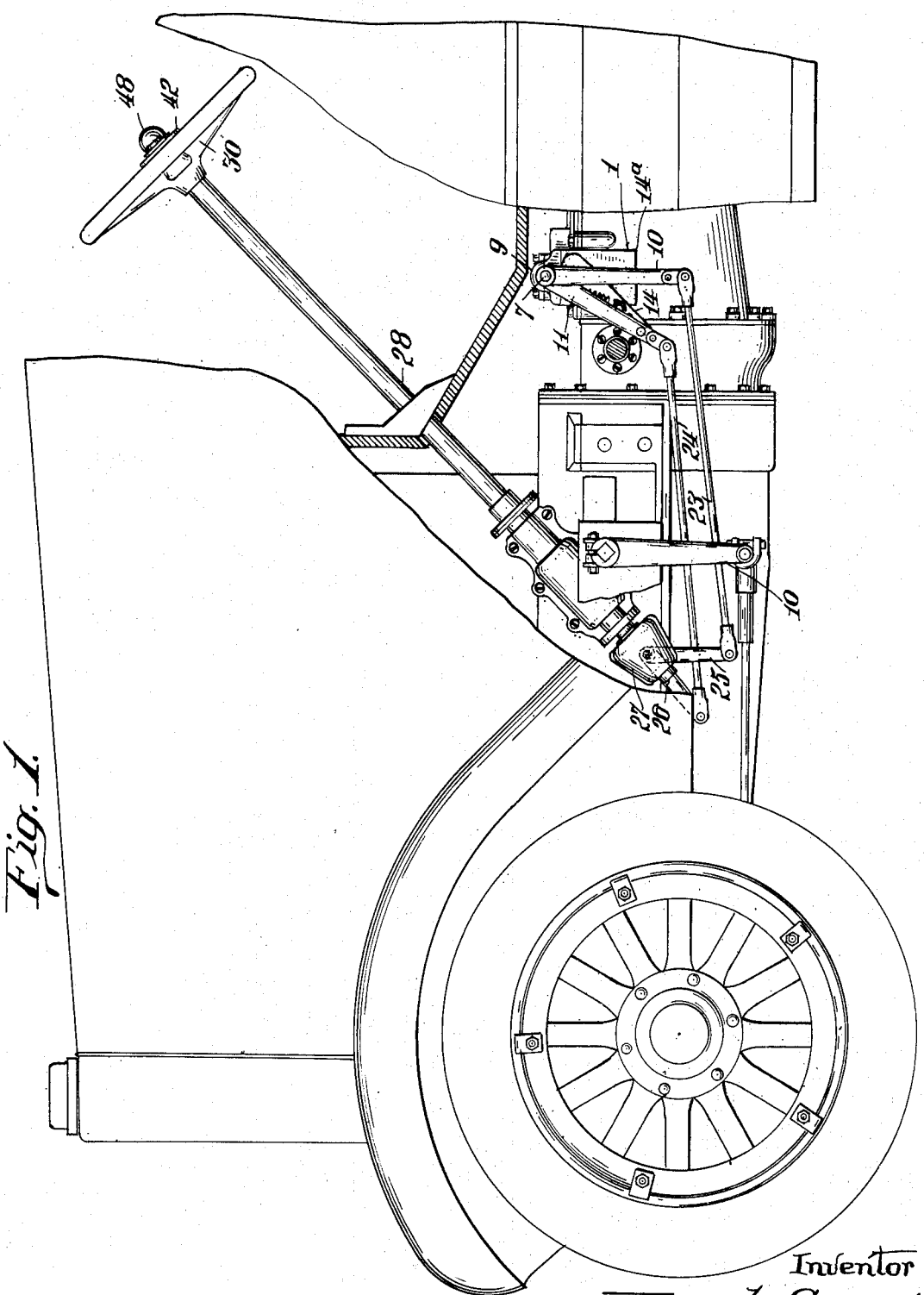
Fig. 1 is a side elevation, partly in vertical longitudinal section, of the forward end portion of a conventional type of passenger automobile equipped with mechanism constructed in accordance with this invention.

In the accompanying drawings the gearing contained in the casing at the lower end of the steering post, and the rock-shafts and rocking levers actuated thereby, are shown as being connected directly with the rocking levers of the change-speed gear set. This direct connection is shown as being exemplary of a suitable connection without limiting the invention to this specific construction as it will be obvious to those skilled in the art that pneumatic, hydraulic, vacuum or electrical means may be interposed between the rocking levers of the change-speed gear set and the first-mentioned rocking levers for control by the latter for actuating the levers of the change-speed gear set.

In the instance illustrated, the change-speed gear set contained in the casing 1, is actuated by a lever 2 (Fig. 8) which reciprocates a sliding plate 3 of said set, and by means of a rocking segmental gear 4 which meshes with a rack-bar 5 on a reciprocable member 6, of said set as shown in Fig. 9. The change-speed gear set shown constitutes no part of the present invention and is of the type known as "synchromesh" now used on certain well-known types of automotive vehicles. Hence, the internal construction of the said set is not shown, especially as any other conventional or special type of such mechanisms may be substituted for the particular type partly illustrated in the accompanying drawings.

The said lever 2 is rigid with the rock-shaft 7 which extends through the hollow rock-shaft 8 journalled in the bearing 9 on the top of the casing 1, said shaft 7 being actuated by the depending rocking lever 10.

The hollow rock-shaft 8 is actuated by means of the depending rocking lever 11.

The said rock-shaft 8 controls the reversing gears and the first speed forward gears of the change-speed gear set, and the rock-shaft 7 controls the second speed and high speed forward gearing of said set.

Owing to the fact that in the specific type of change-speed gear set herein illustrated, a spring is incorporated for urging the reciprocable member 6 in one direction, thus resisting manual operation of said member in one direction, it has been found to be dsirable to provide a spring mechanism associated with the said rocking lever 11 for counteracting the said internal spring in effecting operation of said member 6 in one direction for reasons hereinafter pointed out.

Referring now to Figs. 6 and 8, it will be seen that the lever 11 is equipped with a pin 12 adjacent its connection with the shaft 8 and that a companion pin 13 is mounted in a rocking lever 14 which is pivotally mounted on the bracket plate 14ᵃ of the casing 1 by means of a pin 15 disposed substantially in vertical alignment with the shafts 7 and 8 and appreciably below the same.

The lower end of the lever 14 is equipped with a fork 16 in which a pin 17 on the lever 11 engages. A helical tension spring 18 is engaged at one end with the pin 12 and at its other end with the pin 13.

A spring 19 disposed in a socket 20 of the lever 14 engages a ball 21 which is adapted to engage in a recess 22 in said bracket plate 14ᵃ when said lever 14 attains one limit of its rocking movement to provide a readily releasable latch for resisting displacement of said lever from the said position which it attains as said lever 11 attains its substantially vertical depending position. When said levers 11 and 14 are disposed in the said last-mentioned positions, the plane intersecting the axes of the shafts 7 and 8 and the axis of the pin 13, will also intersect the axis of the pin 15 and thus said lever 14 will have attained a "dead-center" position with respect to the lever 11 and the longitudinal axis of the spring 18 will be coincident with said plane and will also be distended to its predetermined limit in one direction but will be powerless to exert any force to change the relative positions of the levers 11 and 14 until the lever 11 is moved out of the said vertically depending position. A slight movement of the lever 11 from said position will impart a greater arcuate movement in the same direction to the lever 14 thus moving the latter out of said "dead-center" position, together with the spring 18 which now adds its force to that manual force which is applied to the lever 11 to throw the latter to the position shown in Fig. 6. To return the levers 11 and 14 to the said "dead-center" position, the manual force applied must overcome the resistance of the spring 18, but this is unimportant as will be explained hereinafter.

The said levers 10 and 11 are connected, respectively, by means of links 23 and 24, with the rocking levers 25 and 26, respectively, which are actuated by the gearing in the casing 27 at the lower end of the steering post 28 which constitutes the bearing for the hollow shaft 29 of the steering wheel 30.

The lever 26 is rigid with a hollow rock-shaft 31 journalled in a bearing in the cover plate 32 of the gear casing 27. The said hollow rock-shaft 31 is rigid with the segmental bevel gear wheel 33 disposed within said casing and which meshes with the bevel-gear wheel 34 which is loosely mounted on the hollow shaft 35 extending axially of the hollow shaft 29.

The lever 25 is rigid with the rock-shaft 36 which passes through the hollow rock-shaft 31 and the hub of the bevel-gear wheel 33 and is rigid with the bevel-gear wheel 37 which meshes with the bevel-gear wheel 38, the latter being also loosely mounted on the hollow shaft 35 and being opposed to the bevel-gear wheel 34. A spacing sleeve 38ᵃ is interposed between the bevel gears 34 and 38.

The hubs of the bevel-gear wheels 34 and 38 are equipped with tooth-clutch members 39 and 40, respectively, arranged for engagement with the tooth-clutch sleeve or collar 41 which is rigid with the hollow shaft 35.

The said shaft 35 is longitudinally movable relatively to the steering post 28 and the shaft 29 to the extent necessary to move the clutch sleeve or collar 41 from a position wherein it is engaged with the clutch members 39 and is free from the clutch member 40, and vice versa.

Mounted for rotation relatively to the steering wheel 30 and resting in a recess in the hub thereof is a casing 42 equipped with a cover plate 43 which, in practice, is equipped with a push-button switch controlling the electric circuit through a signal horn. The electric wires constituting this circuit pass through the hollow shaft 35 but the said switch and said wires are omitted from illustration in order to avoid confusion and because they constitute no part of this invention.

A rock-shaft 44 (Figs. 2, 4, and 5) is journalled in bearings disposed diametrically of the said casing 42. Said rock-shaft 44 spans the central chamber of the said casing 42 and passes through a longitudinal slot 45 in the upper end portion of the hollow shaft 35.

Rigid with the said upper end portion of said hollow shaft 35 is a rack-bar 46 which extends parallel with the axis of the said shaft and meshes with a segmental gear 47 which is rigid with the rock-shaft 44. The latter is equipped with a hand lever 48 for manually rotating the same about its own axis for imparting longitudinal movement to said shaft 35 to throw the clutch member 41 to any one of its three positions, viz.: neutral, engaged with clutch member 39, or with clutch member 40, respectively.

The rock-shaft 44, after having been moved longitudinally to cause the clutch member 41 to engage one of the companion clutch members 39 or 40, is manually rotated about the axis of the steering post to rotate the said casing 42 and the hollow shaft 35 which is also a rock-shaft, to rotate the bevel gear with which the clutch member 41 is engaged.

The operation of the above-described mechanism is as follows, the clutch member 41 being shown as engaged with the clutch member 40 for effecting second and high speed of the vehicle and the rock-shaft 44 being shown as turned on its own axis from its normal position.

The clutch member 41 is normally disposed in engagement with the clutch member 39 of the bevel gear 34 which is normally disposed in neutral position with its clutch-teeth so disposed that a downward movement of the clutch-member 41 will cause the latter to engage the clutch member 40 and release the clutch member 39. When the gear 34 is disposed in neutral position, the gear-shift member 5 and the shift plate engaged thereby are also disposed in neutral position.

Likewise, the bevel gear 38 must be disposed in neutral position corresponding to the similar position of the lever 2 and the shift plate which is actuated thereby. Hence, none of the pairs of gears of the change-speed gear set are operative.

By turning the rock-shaft 44 about the axis of the steering post, anti-clockwise, through a short arc while the clutch member 41 is engaged with clutch member 39, the change-speed gear set will be caused to throw the reversing gears into operative relation so that, upon throwing in the friction clutch of the vehicle, the latter will travel backward.

Upon releasing the last-mentioned friction clutch and turning the rock-shaft 44 clockwise about the steering post axis, first to restore the gear wheel 34 to neutral position and then beyond said position, the low-speed forward gear set of the change-speed gear set will be thrown into operative relation, so that by again throwing in the last-mentioned friction clutch, the vehicle will move forward at low speed.

To change from low or first speed forward to second speed forward, the last-mentioned friction clutch is again released, and the rock-shaft 44 swung anti-clockwise about the steering-post axis to neutral position and is then turned about its own axis to throw the clutch member out of engagement with the clutch member 39 and into engagement with the clutch member 40. The rock-shaft 44 is now again swung anti-clockwise about the steering-post axis to throw the second speed gear set of the change-speed gear set into operative relation, so that by again throwing in the friction clutch of the vehicle, the latter will be propelled forward at second speed.

To change from second to high speed forward of the vehicle, the last-mentioned friction clutch is released and the lever or rock-shaft 44 is swung clock wise about the steering-post axis, past neutral position and into the position wherein the high speed gear set of the change-speed gear set is operatively disposed.

The movements of the lever 11 effected by the operations of the lever 44 to effect reversing and low-speed forward of the vehicle are aided by the spring 18 and rocking-lever 14 to overcome resistance afforded by the change-speed gear set of the synchromesh type shown, and in the manner hereinabove described.

By again throwing in the last-mentioned friction clutch, the vehicle will be propelled forward at high speed.

Upon releasing the friction clutch and returning the rock-shaft 44 to neutral position from either second or high speed positions, the operator must exert enough force to reset the spring 18 and lever 14 to the aforesaid "dead-center" position, but this force is not very appreciable and can be exercised by a child.

In the instance illustrated, the links 23 and 24 provide direct mechanical connections between the levers 10 and 11 and the arms or levers 25 and 26. It will be obvious, of course, that said links or the last-mentioned levers may constitute electric switch operating means to control electrically actuated means for actuating the said levers 10 and 11 or the shift plates of the change-speed gear set without departing from the invention as defined in the appended claims.

Similarly the levers 25 and 26 or the links 23 and 24 may be utilized to control the valves of fluid pressure means for actuating the levers 10 and 11 or the shift plates of the change-speed gear set without departing from the invention.

In connection with both of the last-mentioned types of means for actuating the change-speed gear set, reference is had to conventional types of such means well known to persons skilled in the automotive vehicle art.

In harmony with the foregoing statements relating to electrical and fluid pressure means, the reference to means for actuating the change-speed gear set, as used in the appended claims, shall be construed to refer to the said levers 10 and 11 or substitutes therefor comprising either electrical or fluid pressure means for doing the work of the said levers and which are controlled by the rock-shafts 31 and 36.

I claim as my invention:

1. In an automotive vehicle, the combination with the change-speed gear set and the steering post thereof, of a gear-casing rigidly connected with the lower end of the said steering post, a pair of opposed bevel gears of different diameters at opposite ends of said casing, a pair of bevel gears meshing with said respective first-named gears and both disposed at one side of said casing, a hollow rock-shaft rigid with one of the last-named gears, a rock-shaft rigid with the other thereof and passing through said hollow rock-shaft, a lever rigid with each of the said rock-shafts and connected with the respective shift levers of the change-speed gear set, a toothed clutch member rigid with each of the respective first-mentioned bevel gears, a tooth clutch sleeve arranged for alternate engagement with said first-named clutch members, a manually rotatable rock-shaft passing through the steering post and on which said first-mentioned bevel gears are loosely mounted, and a hand lever at the upper end of the steering post for rocking the last-named rock-shaft and throwing said clutch sleeve into engagement with either one of the said clutch members.

2. In an automotive vehicle, the combination with the change-speed gear set and the steering post thereof, of a gear casing rigidly mounted upon the said steering post, a bearing in one side of said casing, a pair of co-axial rock-shafts journalled in said bearing, levers rigid with the respective outer ends of said rock-shafts, bevel pinions rigid with the inner ends of said respective shafts, a reciprocable rock-shaft extending through the steering post and said casing, a pair of opposed bevel pinions, each equipped with a clutch face rotatable on said last-named rock-shaft and each, thereof, meshing with one of the first-named pinions, a clutch member rigid with said reciprocable shaft and disposed between the bevel pinions of the latter for selective engagement with either of the first-named bevel pinions, a hand lever for reciprocating and rocking said reciprocable shaft, and operative connection between the first-named levers and said change-speed gear set.

3. In an automotive vehicle, the combination with the change-speed gear set and the steering post thereof, of a gear casing rigidly mounted upon the said steering post, a bearing in one side of said casing, a pair of co-axial rock-shafts journalled in said bearing, levers rigid with the respective outer ends of said rock-shafts, a pair of operating levers controlling the said gear-set, links connecting the respective last-named levers with the respective first-named levers, bevel pinions rigid with the inner ends of said respective shafts, a reciprocable rock-shaft extending through the steering post and said casing, a pair of opposed bevel pinions each equipped with a clutch face rotatable on said last-named rock-shaft and each, thereof, meshing with one of the first-named pinions, a clutch member rigid with said reciprocable shaft and disposed between the bevel pinions of the latter for selective engagement with either of the first-named bevel pinions, and a hand lever for reciprocating and rocking said reciprocable shaft, and operative connection between the first-named lever and said change-speed gear set.

4. A change-speed gear-set operating mechanism for automotive vehicles, comprising a pair of co-axial rock-shafts one of which is hollow and receives the other, a bearing for the hollow shaft, a crank arm for each shaft operatively connected with the change-speed gear set and controlling the latter, a bevel pinion for each shaft, a reciprocable rock-shaft, a bearing for the same rigid with the first-mentioned bearing, a pair of bevel pinions having opposed toothed faces meshing with the first-mentioned respective bevel pinions and rotatable on the reciprocable shaft, opposed tooth-clutch members rigid with said second-named bevel pinions, a tooth-clutch member rigid with said reciprocable shaft and disposed for selective engagement with the companion members of said second-named pinions, and a hand-lever engaged with said reciprocable shaft for reciprocating and rocking the latter.

5. In a change-speed gear set operating mechanism for automotive vehicles including a reciprocable rock-shaft extending through the steering post and a hand lever for operating said shaft, the improvement consisting in a mechanism for transmitting motions of said shaft to the change-speed gear set control means comprising a pair of bevel pinions rotatably mounted on said shaft and spaced from each other, a clutch member for each pinion rigid therewith, a clutch member rigid with said shaft for selective engagement with said pinion clutch members, rock-shafts extending laterally of the said shaft and each equipped with a bevel pinion meshing respectively with the respective first-named pinions, and means on the last-named shafts operatively connecting the same with the change-speed gear set for control of the latter by the said reciprocable shaft.

6. In a change-speed gear set operating mechanism for automotive vehicles equipped with said set including conventional control means for the same and equipped with a manually operable reciprocable rock-shaft extending through the steering post, the improvement consisting of a means for transmitting the motions of said shaft to said control means comprising a gear-casing rigid with the steering post and equipped with bearings at opposite ends for the said reciprocable rock-shaft, a pair of spaced apart bevel pinions rotatable on said shaft within said casing and equipped with opposed tooth-clutch faces, a clutch member disposed between said bevel pinions and rigid with said shaft for engagement with a selected one of said pinions by longitudinal movement of said shaft, a lateral bearing in said casing, a hollow rock-shaft journalled therein, a second rock-shaft extending through said hollow shaft, a bevel pinion on each of said last-named rock-shafts meshing respectively with said first-named bevel pinions within said casing, and a crank-arm on the outer end of each of the last-mentioned rock-shafts operatively connected with said control means.

7. In a change-speed gear set operating mechanism for automotive vehicles equipped with said set including conventional control means for the same and equipped with a manually operable reciprocable rock-shaft extending through the steering post, the improvement consisting of a means for transmitting the motions of said shaft to said control means comprising a gear-casing rigid with the steering post and equipped with bearings at opposite ends for the said reciprocable rock-shaft, a pair of spaced-apart bevel pinions rotatable on said shaft within said casing and equipped with opposed tooth-clutch faces, a clutch member disposed between said bevel pinions and rigid with said shaft for engagement with a selected one of said pinions by longitudinal movement of said shaft, said last-named clutch member being shiftable to release one and engage the other of said first-named clutch member at only one point in the rotation of said shaft, a lateral bearing in said casing, a hollow rock-shaft journalled therein, a second rock-shaft extending through said hollow shaft, a bevel pinion on each of said last-named rock-shafts meshing respectively with said first-named bevel pinions within said casing, and a crank-arm on the outer end of each of the last-mentioned rock-shafts operatively connected with said control means.

8. In a change-speed gear set operating mechanism for automotive vehicles, equipped with said set including conventional control means for the same and equipped with a manually operable reciprocable rock-shaft extending through the steering post, the improvement consisting of a means for transmitting the motions of said shaft to said control means comprising a gear-casing rigid with the steering post and equipped with bearings at opposite ends for the said reciprocable rock-shaft, a pair of spaced apart bevel pinions rotatable on said shaft within said casing and equipped with opposed tooth-clutch faces, a clutch member disposed between said bevel pinions and rigid with said shaft for engagement with a selected one of said pinions by longitudinal movement of said shaft, a lateral bearing in said casing, a hollow rock-shaft journalled therein, a second rock-shaft extending through said hollow shaft, a bevel pinion on each of said last-named rock-shafts meshing respectively with said first-named bevel pinions within said casing and means operatively connecting the last-named rock-shafts with said control means.

9. In a change-speed gear set operating mechanism for automotive vehicles, equipped with said set including conventional control means for the same and equipped with a manually operable reciprocable rock-shaft extending through the steering post, the improvement consisting of a means for transmitting the motions of said shaft to said control means comprising a gear-casing rigid with the steering post and equipped with bearings at opposite ends for the said reciprocable rock-shaft, a pair of spaced-apart bevel pinions rotatable on said shaft within said casing and equipped with opposed tooth-clutch faces, a clutch member disposed between said bevel pinions and rigid with said shaft for engagement with a selected one of said pinions by longitudinal movement of said shaft, said last-named clutch member being shiftable to release one and engage the other of said first-named clutch member at one point in the rotation of said shaft, a lateral bearing in said casing, a hollow rock-shaft journalled therein, a second rock-shaft extending through said hollow shaft, a bevel pinion on each of said last-named rock-shafts meshing respectively with said first-named bevel pinions within said casing, and means operatively connecting the last-named rock-shafts with said control means.

10. In combination with means for actuating the change-speed gear set of an automotive vehicle, a rock-shaft extending through the steering post of the vehicle and reciprocable relatively thereto, a hand lever for rotating said shaft, a manually operable means for imparting a secondary motion to said hand lever for reciprocating said shaft, selectively operable mechanisms associated with said shaft, clutch means including a member rigid with said shaft, and including members associated with said respective mechanisms for selectively operatively associating said respective mechanisms with said shaft as the latter is reciprocated, and means actuated by said respective mechanisms and operatively associated with said first-named means for selectively actuating the said change-speed gear set.

11. In combination with means for actuating the change-speed gear set of an automotive vehicle, a rock-shaft extending through the steering post of the vehicle and reciprocable relatively thereto, a single manually operable lever connected with said shaft for rotating the same, means on said shaft and said lever for reciprocating said shaft upon rotating said lever about its own axis, a pair of selectively operable mechanisms associated with said shaft, clutch means including a member rigid with said shaft, and including members associated with said respective mechanisms for selectively operatively associating said respective mechanisms with said shaft as the latter is reciprocated, and means actuated by said respective mechanisms and operatively associated with said first-named means for selectively actuating the said change-speed gear set.

12. In combination with means for actuating the change-speed gear set of an automotive vehicle, a rock-shaft extending through the steering post of the vehicle and reciprocable relatively thereto, a single manually operable lever connected with said shaft for rotating the latter, cooperating means on said shaft and said lever for reciprocating said shaft as said lever is rotated about its own axis, a pair of selectively operable mechanisms associated with said shaft, clutch means including a member rigid with said shaft, and including members associated with said respective mechanisms for selectively operatively associating said respective mechanisms with said shaft as the latter is reciprocated, and means actuated by said respective mechanisms and operatively associated with said first-named means for selectively actuating the said change-speed gear set.

13. In combination with the change-speed gear set of an automotive vehicle, a casing rigidly mounted at the lower end portion of the steering post of the vehicle, a hollow rock-shaft journalled in a bearing at one side of the casing and projecting from the latter, a rock-shaft passing through the hollow rock-shaft and projecting at both ends beyond the ends of the latter, a lever mounted upon the outer end portion of each of the said rock-shafts and operatively associated with the change-speed gear set for actuating the same, rotatable members rigid with the respective rock-shafts, mechanism disposed within the steering post and said casing for selectively actuating said respective rotatable members and including means for engaging said mechanism with either of said rotatable members to the exclusion of the other thereof, and a hand lever mounted at the upper end of the steering post for actuating the said mechanism.

14. An operating mechanism of the type specified including a casing, a rock-shaft having its lower end portion journalled in bearings in said casing and having its upper end portion disposed within reach of the vehicle driver, a manually operable rock-shaft extending transversely to and engaged with the upper end of the first-named rock-shaft, said second rock-shaft being adapted to swing about its own axis and about the axis of the first rock-shaft, cooperative means including a member on said second rock-shaft for reciprocating the first rock-shaft as said second rock-shaft is rotated on its own axis, a pair of opposed bevel gear wheels in said casing loosely mounted on said first-named rock-shaft, a clutch member rigid with each of said bevel gear wheels, a clutch member rigid with said first rock-shaft for alternately engaging said clutch members on said bevel gear wheels, a pair of concentric bevel gear wheels meshing with said respective first-mentioned bevel gear wheels, and one thereof equipped with a hollow shaft and the other thereof rigid with a shaft extending through said hollow shaft, a rocking lever for each of the said last-mentioned shafts, and operatively associated with the shift levers of the change-speed gear set of the vehicle.

15. In combination with the change-speed gear set of an automotive vehicle, a pair of rocking levers operatively associated with gear shift means of said set, a rock-shaft for each of said levers, one of said rock-shafts being hollow and the other thereof passing therethrough, a bevel gear wheel rigid with each of said respective rock-shafts, a gear casing containing said bevel gear wheels, a pair of opposed bevel gear wheels within said casing meshing with the first-mentioned bevel gear wheels, a reciprocable rock-shaft on which the last-mentioned bevel gear wheels are loosely mounted, a clutch member rigid with said last-named rock-shaft, a clutch member rigid with each of said respective opposed bevel gear wheels, and a manually operable member for reciprocating and rocking said last-mentioned rock-shaft.

16. In an automotive vehicle the combination with the change speed gear set equipped with shift levers, of a pair of rock-shafts disposed one within the other for rotation on a common axis, a bevel gear for each rock-shaft, an actuating shaft extending transversely of the said rock-shaft, a pair of opposed spaced bevel gears rotatable on said actuating shaft and meshing with said respective bevel gears on said rock-shaft, a tooth-clutch member rigid with each of said gears on said actuating shaft, a tooth-clutch member rigid with the latter between said last named gears and shiftable for engagement with either of said gears, a hand lever operatively engaged with said actuating shaft for reciprocating the latter and said clutch member on said shaft and rocking the latter, a rocking lever rigid with each of said rock-shafts, and links connecting said levers with the shift levers of the change-speed gear set.

17. In an automotive vehicle equipped with a change-speed gear set equipped with gear shift levers of mechanism for operating said levers comprising a gear casing, a main rock-shaft passing through and journalled in bearings in the end walls of said casing and reciprocable relatively to the latter, a tooth-clutch member rigid with said shaft, a hand lever operatively connected with said shaft for reciprocating and rocking the latter, a pair of opposed bevel gears, each equipped with a tooth clutch member and loosely mounted on said shaft, said last-named clutch members being opposed to opposite ends of the first-named clutch member and the latter and said bevel gears disposed within said casing, a bearing at one side of said casing, a hollow rock-shaft journalled in said bearing and equipped with a bevel gear meshing with one of the gears on the main rock-shaft, a rock-shaft passing through said hollow shaft and equipped with a bevel gear meshing with the other of the bevel gears of the main rock-shaft, levers rigid with the respective hollow rock-shaft and the rock-shaft passing through the same, and links connecting said levers with the shift levers of the change speed gear set.

18. In an automotive vehicle equipped with a change speed gear set equipped with gear shift levers, of mechanism for operating said levers comprising a gear casing, a main rock-shaft passing through and journalled in bearings in the end walls of said casing and reciprocable relatively to the latter, a tooth-clutch member rigid with said shaft, a hand lever operatively connected with said shaft for reciprocating and rocking the latter, a pair of opposed bevel gears each equipped with a tooth clutch member and loosely mounted on said shaft, said last-named clutch members being opposed to opposite ends of the first-named clutch member and the latter and said bevel gears disposed within said casing, a bearing at one side of said casing, a hollow rock-shaft journalled in said bearing and equipped with a bevel gear meshing with one of the gears on the main rock-shaft, a rock-shaft passing through said hollow shaft and equipped with a bevel gear meshing with the other of the bevel gears of the main rock-shaft, levers rigid with the respective hollow rock-shaft and the rock-shaft passing through the same, and links connecting said levers with the shift levers of the change speed gear set, said interengaging clutch members being arranged so that said sliding clutch member is engaged at all times with a companion clutch member and so that it cannot be shifted to release one and engage the other of the said companion clutch members except when the shift levers of the change-speed gear set are in neutral position.

19. The combination with a change-speed gear set equipped with a pair of shift levers, of a pair of rock-shafts having a common axis, a lever rigid with each of said rock-shafts and operatively connected with said respective shift levers for actuating the latter, a bevel gear for each rock-shaft rigid therewith and disposed one in front of the other, a hollow shaft extending perpendicularly of said rock-shafts, a pair of opposed bevel gears rotatable and slidable on said hollow shaft and meshing with said respective bevel gears on said rock-shafts, opposed clutch teeth rigid with said respective gears on said hollow shaft, a tooth clutch member rigid with said hollow shaft and shiftable to engage the clutch teeth of one or other of the gears on the latter as said hollow shift is reciprocated, a hand lever pivotally mounted on an axis perpendicular to the axis of the hollow shaft and engaged with said hollow shaft for shifting and rocking said hollow shaft.

20. Means for controlling a change-speed gear set equipped with a pair of gear-shift levers, comprising a gear casing, a shaft passing through and journalled in bearings in said casing and rotatable and reciprocable relatively to said casing, a tooth clutch member rigid with said shaft within said casing, a pair of opposed bevel gears loosely mounted on said shaft within said casing and held against longitudinal movement relatively to the latter, a tooth clutch member rigid with each of the respective bevel gears and arranged so that one thereof is engaged by said tooth clutch on said shaft as the other thereof is released, a hollow rock-shaft journaled in a bearing at one side of said casing, a bevel gear wheel rigid therewith and meshing with one of the first-named bevel gears, a rock-shaft passing through said hollow rock-shaft, a bevel gear rigid therewith and meshing with the other of said first-named bevel gears, a lever for each of said last-named rock-shafts rigid therewith, connections between said levers and the shift levers of the gear set, and a hand lever engaged with said first-named shaft for reciprocating and rocking the latter.

21. The combination with means for operating a change-speed gear set, of a gear casing, a main rock-shaft extending through and reciprocable relatively to the said casing, a tooth clutch member rigid with said shaft within said casing, two bevel gears loosely mounted on said shaft and each equipped with clutch teeth opposed respectively to opposite ends of the clutch member, means for holding said gears against longitudinal movement in said casing, a rock-shaft equipped with a bevel gear meshing with one of said first-named bevel gears, a second rock-shaft equipped with a bevel gear meshing with the other of the first-named bevel gears, said rock-shafts having a common axis, means connecting said respective last-named rockshafts with the respective shift levers of the change-speed gear set, and a hand lever rotatable on an axis perpendicular to the axis of the first-named shaft and engaged with the latter for reciprocating and rocking the same.

22. The combination with means for operating a change-speed gear set, of a gear casing, a main rockshaft extending through and reciprocable relatively to the said casing, a tooth clutch member rigid with said shaft, two bevel gears loosely mounted on said shaft and each equipped with clutch teeth opposed respectively to opposite ends of the clutch member and arranged relatively thereto to cause the same to pass into engagement with the one of said gears as it passes out of engagement with the other thereof, a pair of laterally disposed rock-shafts each geared to one of said respective bevel gears, means connecting said respective last-named rockshafts with the respective shift levers of the change-speed gear set, and a hand lever, rotatable on an axis perpendicular to the axis of the first-named shaft and engaged with the latter for reciprocating and rocking the same.

23. In an automotive vehicle, the combination with the change-speed gear set and the steering post thereof, of a gear casing rigidly mounted upon the said steering post, a bearing in one side of said casing, a pair of co-axial rock-shafts journalled in said bearing, levers rigid with the respective outer ends of said rock-shafts, bevel pinions rigid with the inner ends of said respective shafts, a reciprocable rock-shaft extending through the steering post and said casing, a pair of opposed bevel pinions, each equipped with a clutch face rotatable on said last-named rock-shaft and each, thereof, meshing with one of the first-named pinions, a clutch member rigid with said reciprocable shaft and disposed between the bevel pinions of the latter for selective engagement with either of the first-named bevel pinions, manually controlled means for effecting reciprocation and rocking of said reciprocable shaft, and operative connection between the first-named levers and said change-speed gear set.

24. A change-speed gear-set operating mechanism for automotive vehicles, comprising a pair of co-axial rock-shafts, one of which is hollow and receives the other, a bearing for the hollow shaft, a crank arm for each shaft operatively connected with the change-speed gear set and controlling the latter, a bevel pinion for each shaft, a reciprocable rock-shaft, a bearing for the same rigid with the first-mentioned bearing, a pair of bevel pinions having opposed toothed faces meshing with the first-mentioned respective bevel pinions and rotatable on the reciprocable shaft, opposed tooth-clutch members rigid with said second-named bevel pinions, a tooth-clutch member rigid with said reciprocable shaft and disposed for selective engagement with the companion members of said second-named pinions, and manually controlled means for effecting actuation of said reciprocable shaft for reciprocating and rocking the latter.

25. In a change-speed gear set operating mechanism for automotive vehicles including a reciprocable rock-shaft extending through the steering post and a manually controlled means for operating said shaft, the improvement consisting in a mechanism for transmitting motions of said shaft to the change-speed gear set control means comprising a pair of bevel pinions rotatably mounted on said shaft and spaced from each other, a clutch member for each pinion rigid therewith, a clutch member rigid with said shaft for selective engagement with said pinion clutch members, rock-shafts extending laterally of the said shaft and each equipped with a bevel pinion meshing respectively with the respective first-named pinions, and means on the last-named shafts operatively connecting the same with the change-speed gear set for control of the latter by the said reciprocable shaft.

26. In a combination with means for actuating the change-speed gear set of an automotive vehicle, a rock-shaft extending through the steering post of the vehicle and reciprocable relatively thereto, manually controlled means for selectively rotating and reciprocating said shaft, selectively operable mechanisms associated with said shaft, clutch means including a member rigid with said shaft, and including members associated with said respective mechanisms for selectively operatively associating said respective mechanisms with said shaft as the latter is reciprocated, and means actuated by said respective mechanisms and operatively associated with said first-named means for selectively actuating the said change-speed gear set.

27. In a combination with the change-speed gear set of an automotive vehicle, a pair of rocking levers operatively associated with gear shift means of said set, a rock-shaft for each of said levers, one of said rock-shafts being hollow and the other thereof passing therethrough, a bevel gear wheel rigid with each of said respective rock-shafts, a gear casing containing said bevel gear wheels, a pair of opposed bevel gear wheels within said casing meshing with the first-mentioned bevel gear wheels, a reciprocable rock-shaft on which the last-mentioned bevel gear wheels are loosely mounted, a clutch member rigid with said last-named rock-shaft, a clutch member rigid with each of said respective opposed bevel gear wheels and manually controlled means for effecting reciprocation and rocking of said last-mentioned rock shaft.

28. In combination with the change-speed gear set of an automotive vehicle, a pair of rocking levers operatively associated with gear shift means of said set, a rock-shaft for each of said levers, one of said rock-shafts being hollow and the other thereof passing therethrough, a bevel gear wheel rigid with each of said respective rock-shafts, a gear casing containing said bevel gear wheels, a pair of opposed bevel gear wheels within said casing meshing with the first-mentioned bevel gear wheels, a reciprocable rock-shaft on which the last-mentioned bevel gear wheels are loosely mounted, a clutch member rigid with said last-named rock-shaft, a clutch member rigid with each of said respective opposed bevel gear wheels, and manually controlled means for selectively actuating said last-named rockshaft for determining the positions of the levers controlling the change-speed gear set.

FRANK GIRARDI.